Patented Apr. 26, 1932

1,855,353

UNITED STATES PATENT OFFICE

DAVID L. JACOBSON, OF PITTSBURGH, PENNSYLVANIA, ASSIGNOR TO THE KOPPERS COMPANY, A CORPORATION OF PENNSYLVANIA

PROCESS OF ACTIFICATION OF ALKALINE SULPHIDE SOLUTIONS

No Drawing. Application filed January 8, 1927, Serial No. 159,999. Renewed May 7, 1930.

This invention relates to the actification of alkaline solutions containing soluble sulphide and especially to the actification of fouled alkaline solutions previously used for the removal of hydrogen sulphide from fuel gas, foul air or the like.

An object of my invention is to provide a process for converting sulphide in alkaline solution to fixed sulphur salt.

A second object of my invention is to provide a process of actifying alkaline sulphide solutions by means of aeration and without liberation of noxious gas.

A further object of my invention is to prevent the liberation of free sulphur in the actification of alkaline sulphide solutions.

My invention has for other objects such other operative advantages or results as may hereinafter be found to obtain.

When a simple alkaline sulphide solution is aerated for actification thereof, or otherwise treated with an inert gas, the air or gas effects a liberation of hydrogen sulphide from the solution. In my U. S. Patent No. 1,390,037, granted Sept. 6, 1921, I describe and claim a process of treating gas containing hydrogen sulphide with an alkaline solution, for example, a solution of sodium carbonate, for the removal of acidic impurities, such as hydrogen sulphide and hydrogen cyanide. The alkaline solution is circulated through a cycle comprising an absorption stage in contact with the gas being purified, and an actification stage wherein the solution, fouled by previous contact with the gas, is aerated or otherwise treated with a current of inert gas.

In the actification stage, the reaction which took place in the absorption stage and involving the absorption of hydrogen sulphide is reversed. The hydrogen sulphide is carried out of the solution by the air or inert gas used for actification and the alkali is regenerated for further use. This procedure represents, in many respects, the simplest and most economical process of gas purification which has yet been devised, but is open to the disadvantage that the so-called actifier air containing hydrogen sulphide removed from th fouled solution must be disposed of in many cases where it would otherwise be objectionable.

More recent processes of gas purification have shown the use of certain metallic compounds suspended in the alkaline liquid, said compounds being effective to promote the conversion of absorbed sulphide to free sulphur. In such processes, however, somewhat elaborate aeration apparatus is required and a large amount of sulphur is recovered. In many instances, however, these recent processes are very desirable, especially where emission of noxious gas into the atmosphere must be avoided, and a ready market for sulphur exists.

I have discovered that the presence of certain organic compounds in an alkaline sulphide solution, in the absence of certain metallic compounds such as iron oxide, cobalt oxide and the like, and upon aeration, promotes the conversion of the soluble sulphide to fixed sulphur salts, such as sodium thiosulphate, and substantially inhibits the liberation of hydrogen sulphide and/or sulphur.

The organic compounds which I have found suitable for this purpose are aromatic ring compounds containing two or more substitution groups at least one of which is a hydroxyl (OH) group. The compound which I prefer to use is hydroquinone, $C_6H_4(OH)_2$, but other compounds, such as catechol, $C_6H_4(OH)_2$, para-aminophenol, $C_6H_4(OH)\cdot NH_2$, may be used successfully.

It should be noted that the designation recited above excludes a compound such as phenol, $C_6H_5(OH)$, which contains only one substituted group, and which I have found is not comparable in effect with compounds such as hydroquinone, which fall within said designation.

It is further pointed out that the effect of such compounds upon the actification of simple alkaline sulphide solutions is not similar to the effect of the same compounds upon the actification of sulphides in alkaline solution and also in the presence of purifying agents such as iron oxide, nickel sulphide, or the like.

However, these organic compounds may be used in conjunction with a small amount of such an inorganic salt as cupric chloride, the use of which is in some instances desirable.

In carrying out a process of gas purification according to my invention, I preferably circulate a solution of from 1 to 3% of sodium carbonate containing up to 1% of hydroquinone over the gas to be purified and through an actification stage wherein the solution is aerated, in a cyclic manner. During the performance of the process, fixed sulphur salts accumulate in the alkaline liquid and portions of the latter may be discarded from time to time or treated for the recovery of constituents. In order to aid the hydroquinone in promoting the formation of fixed sulphur salts, I prefer to maintain a relatively high alkalinity in the solution and also to maintain a relatively high temperature in the same.

The aeration is preferably conducted in a tower provided with suitable contact apparatus over which the fouled solution flows in counter-current to a current of air, but the aeration may be otherwise performed, as, for example, where a body of accumulated solution is aerated by means of finely comminuted air forced into the same.

As an example of the utility of my invention, I will now describe the following results: When 100 cc. of a solution containing 26.5 grams per liter of sodium bicarbonate and 13.2 grams per liter of sodium carbonate is treated by passing gas therethrough containing 250 grains of hydrogen sulphide per 100 cubic ft. and no oxygen, for 30 minutes and at the rate of 2.0 cubic ft. per hour and the thereby sulphided solution is then aerated at a rate of 0.3 cubic ft. per hour, the air current will contain about 50 grains of hydrogen sulphide per 100 cubic ft. after the air is passed for 1.5 hours. After 2 hours, the air will contain about 40 grains of hydrogen sulphide per 100 cubic ft. and for a number of hours following the air will still contain a large amount of $H_2S$. However, when the above experiment is repeated with the addition of 0.05% of hydroquinone to the alkaline solution, the air will contain only 10 grains of hydrogen sulphide per 100 cubic ft. after 1.5 hours of aeration, while, at the end of 2 hours, the air used for aeration is absolutely clean of hydrogen sulphide. No sulphur is liberated and substantially all of the hydrogen sulphide has been converted to fixed sulphur salts, such as sodium thiosulphate.

As a further example of the utility of my invention, I will now cite the following results. When air containing about 45 grains of $H_2S$ per 100 cubic ft. is passed through 100 cc. of such a solution, as is recited above, in the absence of hydroquinone at a rate of 0.85 cubic ft. per hour, the air escaping from the solution is found to contain hydrogen sulphide almost from the beginning, and as the aeration is continued, an increasing amount of hydrogen sulphide is found in said air. For example, at the end of one hour, the air contains 9 grains of $H_2S$ per 100 cubic ft., and at the end of 2 hours, the air contains 20 grains of $H_2S$ per 100 cubic ft. If the experiment be repeated, but in the presence of 0.05% of hydroquinone in the alkaline solution, the air escaping from the solution will be found to contain no hydrogen sulphide over a period of several hours. It thus becomes necessary only to maintain the alkalinity of the solution and a concentration of 0.05% hydroquinone to insure complete removal of hydrogen sulphide from air. Substantially no free sulphur is liberated and substantially all of the hydrogen sulphide is converted to fixed sodium salt, such as sodium thiosulphate.

I may add hydroquinone or the equivalent thereof to an alkaline sulphide solution directly, but I prefer to add the organic material to an alkaline solution and to aerate the same prior to adding it to the alkaline sulphide solution, the gas purification liquor, or the like.

My invention thus provides an advantageous process of purifying fuel gas from hydrogen sulphide with an alkaline solution while avoiding the liberation of either free sulphur or hydrogen sulphide, and for the actification of alkaline sulphide solutions in general. On the other hand, the sulphide in the alkaline solution is caused to be converted to sodium thiosulphate, or other fixed salt, which may be treated for the recovery of a valuable by-product.

My invention is not limited to the specific examples hereinabove given by a way of illustration but may be variously embodied and practiced within the scope of the following claims.

I claim as my invention:

1. The process of converting sulphide in alkaline solution to sodium thiosulphate which comprises aerating the solution in the presence of an aromatic ring compound containing at least two substituted groups, one of which is a hydroxyl group.

2. The process of converting sulphide in alkaline solution to sodium thiosulphate which comprises aerating the solution in the presence of hydroquinone.

3. The process of actifying an alkaline sulphide solution which comprises aerating it in the presence of hydroquinone.

4. A cyclic process of purifying gas which comprises recirculating an alkaline solution containing an aromatic ring compound containing at least two substituted groups, one of which is a hydroxyl group, over the flowing gas for the removal of hydrogen sulphide, removing said solution after contact with the gas, aerating it and returning it to contact with the gas.

5. A cyclic process of purifying gas which comprises recirculating an alkaline solution containing an aromatic ring compound containing at least two substituted groups, one of which is a hydroxyl group, and cupric chloride, over the flowing gas for the removal of hydrogen sulphide, removing said solution after contact with the gas, aerating it and returning it to contact with the gas.

6. A cyclic process of purifying gas which comprises recirculating an alkaline solution containing hydroquinone over the flowing gas for the removal of hydrogen sulphide, removing said solution after contact with the gas, aerating it and returning it to contact with the gas.

7. The process of purifying gas from hydrogen sulphide which comprises recirculating an absorbent liquid over the flowing gas and through an actification stage and maintaining a concentration of from 1 to 3% of alkalinity and 0.05% of hydroquinone in said absorbent solution.

8. The process of purifying gas from hydrogen sulphide which comprises recirculating an absorbent liquid over the flowing gas and through an actification stage, maintaining a concentration of from 1 to 3% of alkalinity and 0.05% of hydroquinone in said absorbent solution, and discarding portions of said absorbent solution from time to time to reduce the concentration of fixed salts.

9. The process of converting sulphide in alkaline solution to sodium thiosulphate which comprises aerating the solution in the presence of hydroquinone and cupric chloride.

In testimony whereof, I have hereunto subscribed my name this 3rd day of January, 1927.

DAVID L. JACOBSON.